United States Patent [19]

Letica

[11] 4,383,819
[45] May 17, 1983

[54] APPARATUS FOR FORMING A CONTAINER

[75] Inventor: Ilija Letica, Oxford, Mich.

[73] Assignee: Letica Corporation, Rochester, Mich.

[21] Appl. No.: 348,480

[22] Filed: Feb. 12, 1982

Related U.S. Application Data

[63] Continuation of Ser. No. 169,331, Jul. 16, 1980, abandoned.

[51] Int. Cl.[3] ............... B29F 1/00; B29C 1/00; B29C 7/00
[52] U.S. Cl. ..................... 425/577; 249/58; 249/59; 249/63; 249/180; 249/184; 249/144; 249/66 R; 249/160; 425/556; 425/457; 425/393; 425/403; 425/DIG. 5; 425/DIG. 58
[58] Field of Search ............ 249/58, 59, 63, 179, 249/180, 184, 185, 178, 66 R, 160; 425/577, DIG. 58, 457, 393, DIG. 5, 556, 403

[56] References Cited

U.S. PATENT DOCUMENTS

| | | | |
|---|---|---|---|
| 404,673 | 6/1889 | Bennett | 249/181 |
| 3,052,916 | 9/1962 | Campbell | 425/DIG. 5 |
| 3,210,039 | 10/1965 | Long | 249/181 |
| 3,248,756 | 5/1966 | Mills et al. | 249/180 X |
| 3,339,242 | 9/1967 | Lamb | 425/577 X |
| 3,358,330 | 12/1967 | Pacciarini | 249/180 X |
| 3,373,460 | 3/1968 | Ladney | 425/DIG. 58 |
| 3,482,815 | 12/1969 | Naturale | 425/457 X |
| 3,677,684 | 7/1972 | Platz | 425/393 |
| 3,784,338 | 1/1974 | Previati | 249/180 X |
| 3,865,529 | 2/1975 | Guzzo | 425/577 X |
| 3,905,740 | 9/1975 | Lovejoy | 425/577 X |
| 3,986,439 | 11/1976 | Schmitzberger | 249/184 X |
| 4,125,246 | 11/1978 | Von Holdt | 425/577 X |
| 4,209,160 | 6/1980 | Vanotti | 249/63 X |
| 4,239,477 | 12/1980 | Tulhaber | 249/180 X |

Primary Examiner—J. Howard Flint, Jr.
Attorney, Agent, or Firm—Krass, Young & Schivley

[57] ABSTRACT

A bucket shaped container having a rim opening smaller than the diameter of the sidewall thereof is injection molded from thermoplastic material using a die set including a molding core which collapses to allow axial removal of the molded container from the mold. The molding core comprises a plurality of individual, wedge shaped outer core sections which collectively form a continuous molding surface and are slidably mounted on a tapered inner core to allow axial sliding movement of the outer core sections relative to the inner core. Each of the outer core sections is also mounted for radial sliding movement on a mounting plate which circumscribes the molding core and is mounted for reciprocating axial movement relative to the inner core. Reciprocation of the mounting plate produces simultaneous axial and radial movement of the outer core sections throughout their entire lengths between an expanded molding position and a collapsed container releasing position. A plurality of rim molding segments mounted for radial sliding movement on the mounting plate automatically shift between molding and release positions in synchronism with the axial travel of the outer core sections.

6 Claims, 10 Drawing Figures

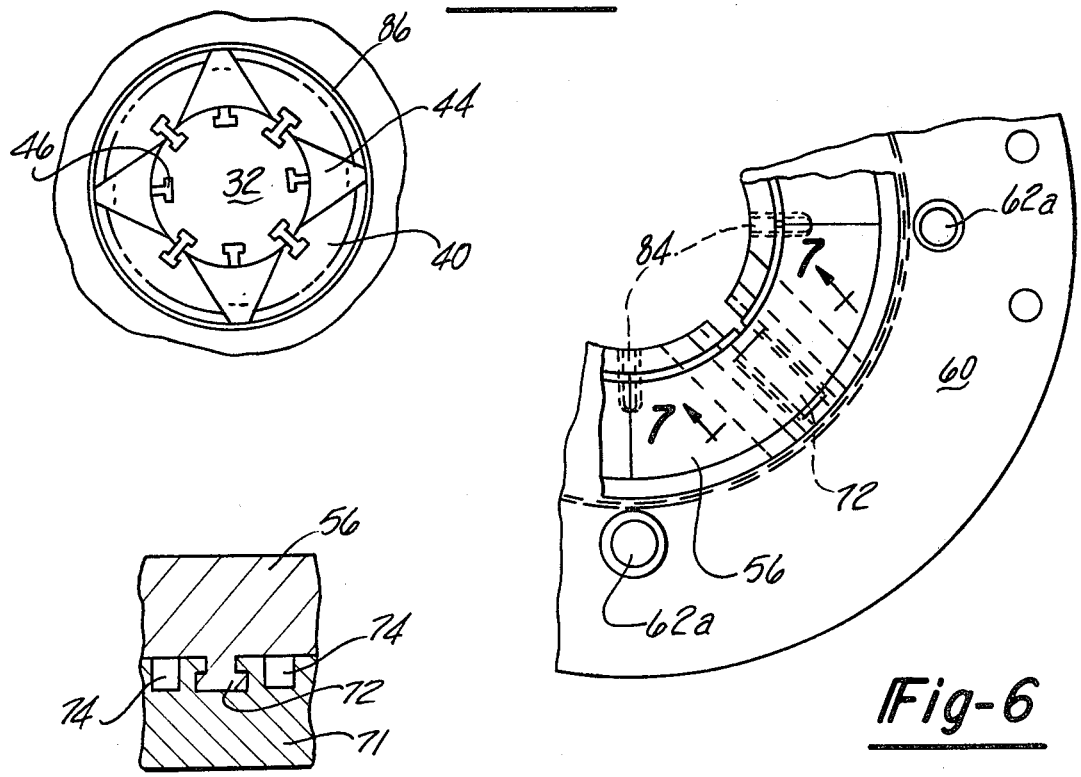
Fig-5
Fig-6
Fig-7
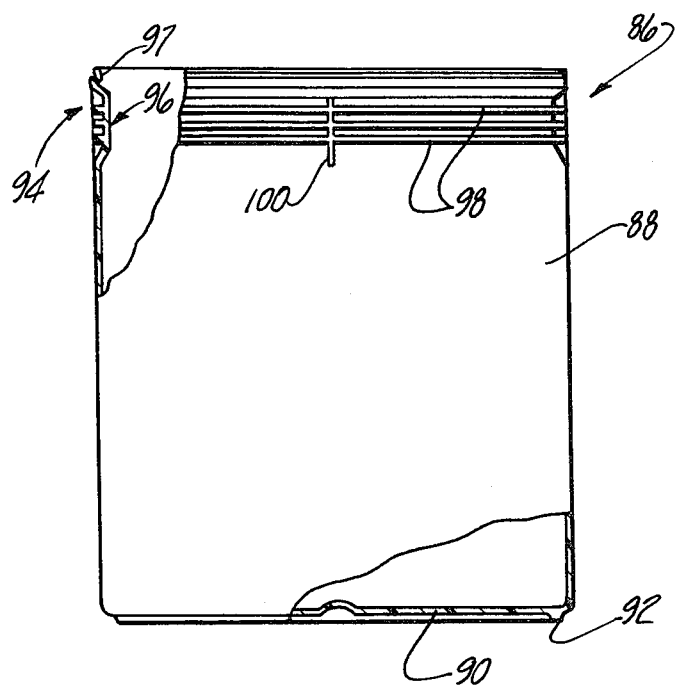
Fig-9

APPARATUS FOR FORMING A CONTAINER

This application is a continuation of application Ser. No. 169,331, filed July 16, 1980, now abandoned.

TECHNICAL FIELD

The present invention generally relates to molding apparatus of the type having movable mold sections, and deals more particularly with a mold and related molding process in which a collapsable core is employed to form a cavity in a molded article wherein interior dimensions of the cavity exceed that of the opening in the article into which the molding core extends.

BACKGROUND ART

Containers such as buckets and pails of unitary construction molded from plastic materials are becoming more wide spread in use due in part to the fact that they may be economically produced in large quantities. Molded plastic containers have replaced many types of previous metal constructions, however the use of containers for certain products, such as those which are toxic or flammable, require that the container be exceptionally rigid and not subject to rupture or deformation under ordinary use. In connection with this latter mentioned use, molded plastic containers have not been entirely successful in replacing metal constructions for reasons which will be discussed below. In designing a molded plastic container which is safe for use with paints, thinners and the like, it is obsolutely necessary that the lid of the container remain securely fastened to prevent leakage even when the container is roughly handled, as during shipping. Although interlocks between the container lid and the rim of the container have been designed which form a liquid tight seal under ordinary conditions, such seal may be broken and the lid may inadvertently be removed from the container if the rim exhibits flexion.

In order to prevent flexing of the container rim, circumferential reinforcement ribs have been molded integral with the rim in order to increase the hoop strength of the rim. Since it is also a requirement of these type of containers that the sidewalls thereof be free from projections, it is necessary to recess the circumferential reinforcement ribs in the sidewalls of the container; this in turn requires that the rim be of reduced inside diameter compared to the inside diameter of the sidewall of the container.

Because of the reduced rim diameter, it has been necessary in the past to produce the containers using a two step blow and injection molding process which involves melting a thermoplastic resin; forming a tube or parison from the melted resin using injection molding techniques; and, inflating the parison within a blow mold to form the container. This process is undesirable, however, since the two production steps not only require at least two molds but are also time consuming compared to a one step process.

Other types of molding processes, such as injection molding, have not been successfully employed in the past to mold containers of the type mentioned because collapsable molding cores of the type necessary for forming the interior sidewalls of the container have not heretofore been available. Known prior art collapsable cores, such as those disclosed in U.S. Pat. Nos. 3,247,548 and 3,660,001, are suitable for forming cavities in relatively shallow articles such as threaded container caps, but are not capable of forming deep cavities, such as the interior of a bucket. Collapsable cores of the type disclosed in these patents are formed from a plurality of circularly disposed, resilient molding segments circumferentially surrounding an inner core and rigidly connected to each other at one end thereof. Upon removal of the inner core, the natural resilience of the molding segments causes one end of such segments to spring radially inward, thereby collapsing the outer extremities of the molding segments to release the molded article. Since only the outer extremities of the molding segments collapse a substantial distance, these collapsable cores may not be practically employed for molding deeper cavities such as the interior of the container itself.

From the foregoing, it is apparent that there is a clear need in the art for a container of the type described above which comprises high density plastic material. It is therefore an important object of the present invention to provide a container of bucket-like configuration having a reinforced rim provided with an interior diameter less in magnitude than the interior diameter of the sidewall of the container, but yet which is exceptionally rigid and durable.

Another important object of the invention is to provide a one step process for molding a container of the type mentioned above.

Another object of the invention is to provide die apparatus suitable for injection molding plastic material to form the container mentioned above.

A still further object of the invention is to provide a die apparatus having a collapsable core formed of a plurality of core segments each being radially shiftable along the entire lengths thereof.

These and further objects will be made clear or will become apparent during the course of the following description.

SUMMARY OF THE INVENTION

A bucket shaped container having a reduced diameter rim is injection molded from a thermoplastic material by a die set including a molding core which collapses to allow removal of the molded container from the molding core. The molding core comprises a plurality of individual, wedge shaped outer core sections which collectively form a continuous molding surface and are slidably mounted on a tapered inner core to allow axial travel of the outer core sections relative to the inner core. Each of the outer core sections is also mounted for radial sliding movement on a mounting plate which circumscribes the molding core and is mounted for reciprocating axial movement. Reciprocation of the mounting plate produces simultaneous axial and radial movement of the outer core sections throughout their entire lengths between an extended molding position and a collapsed container releasing position. A plurality of molding segments mounted for radial sliding movement on the mounting plate automatically shift between molding and release positions in synchronism with the axial travel of the outer core sections.

BRIEF DESCRIPTION OF THE DRAWINGS

In the drawings, which form an integral part of the specification and are to be read in conjunction therewith, and in which like reference numerals are employed to designate identical components in the various views:

FIG. 5 is a fragmentary plan view of the molding core of the molding apparatus shown in FIG. 1, in an expanded, molding position;

FIG. 6 is a fragmentary plan view of one of the molding segments carried by the mounting plate;

FIG. 7 is a sectional view taken along the line 7—7 in FIG. 6;

FIG. 9 is a side view of the container formed by the process of the present invention using the molding apparatus depicted in FIG. 1, parts being broken away in section for clarity; and, FIG. 10 is an exploded, perspective view showing the relationship between the mounting plate, the outer core sections, and a molding segment.

DETAILED DESCRIPTION OF THE INVENTION

Figure 1:
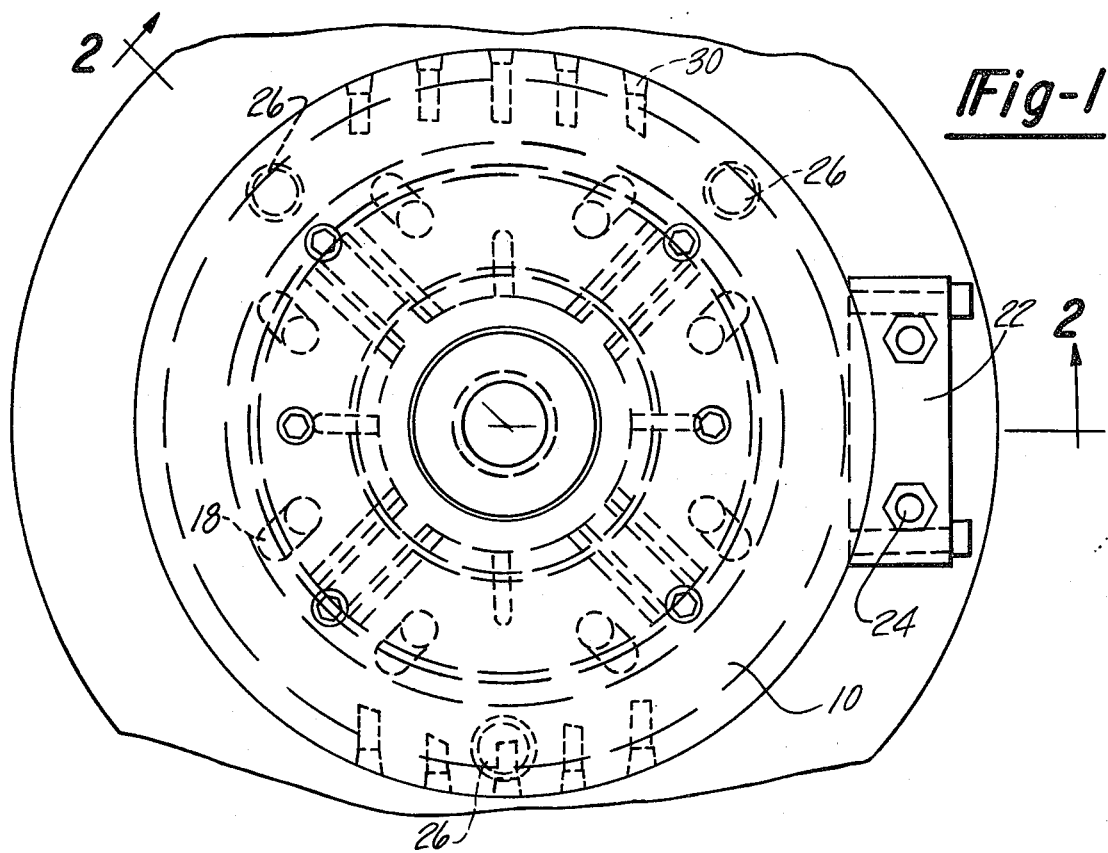
FIG. 1 is a plan view of the die apparatus forming the preferred embodiment of the present invention, shown in a closed molding position.

Referring first to FIG. 9, the present invention is concerned with a process and apparatus for molding a pail or bucket shaped container 86 from plastic material, preferably thermoplastic such as polyethylene. The pail 86 includes a cylindrically shaped sidewall 88 extending upwardly from a circular base 90. A downwardly depending stacking flange 92 is formed integral with the bottom of the base 90 and is adapted to conformingly seat in an annular depression in a lid (not shown) of a similar container (not shown). The top of the container 86 is essentially open and is defined by a circular rim 94 which comprises interior sidewall portions 96 having a diameter less in magnitude than the inside diameter of the sidewall 88. The exterior of rim 94 is defined by a plurality of spaced circumferentially extending reinforcement ribs 98 which extend radially outward a distance no greater than the exterior surfaces of sidewall 88. Reinforcement ribs 98 provide the rim 94 with added hoop strength so as to maintain the rim 94 extremely rigid and therefore not subject to substantial flexing.

The rim 94 is also provided with a plurality of circumferentially spaced, longitudinally extending vertical reinforcement ribs 100 connecting the circumferential reinforcement ribs 98. Vertical reinforcement ribs 100 extend radially coextensive with ribs 98 and provide the rim with added compressive strength in the axial direction of container 86 so as to enable the container 86 to withstand force imposed on the rim 94 when a lid (not shown) is forcibly installed thereon. The rim 94 further includes a locking edge construction 97 which is adapted to lockingly interfit with a mating lid (not shown) to form a fluid tight seal between the lid and container 86.

As will become apparent below, the container 86 is formed by injection molding a thermoplastic material, such as polyethylene, using a novel molding apparatus and preferably possesses a density of 0.947 to 0.965 grams/cubic centimeter. The melt index of the material forming the molded container 86 is preferably between 3 and 18 melt.

Figure 2:
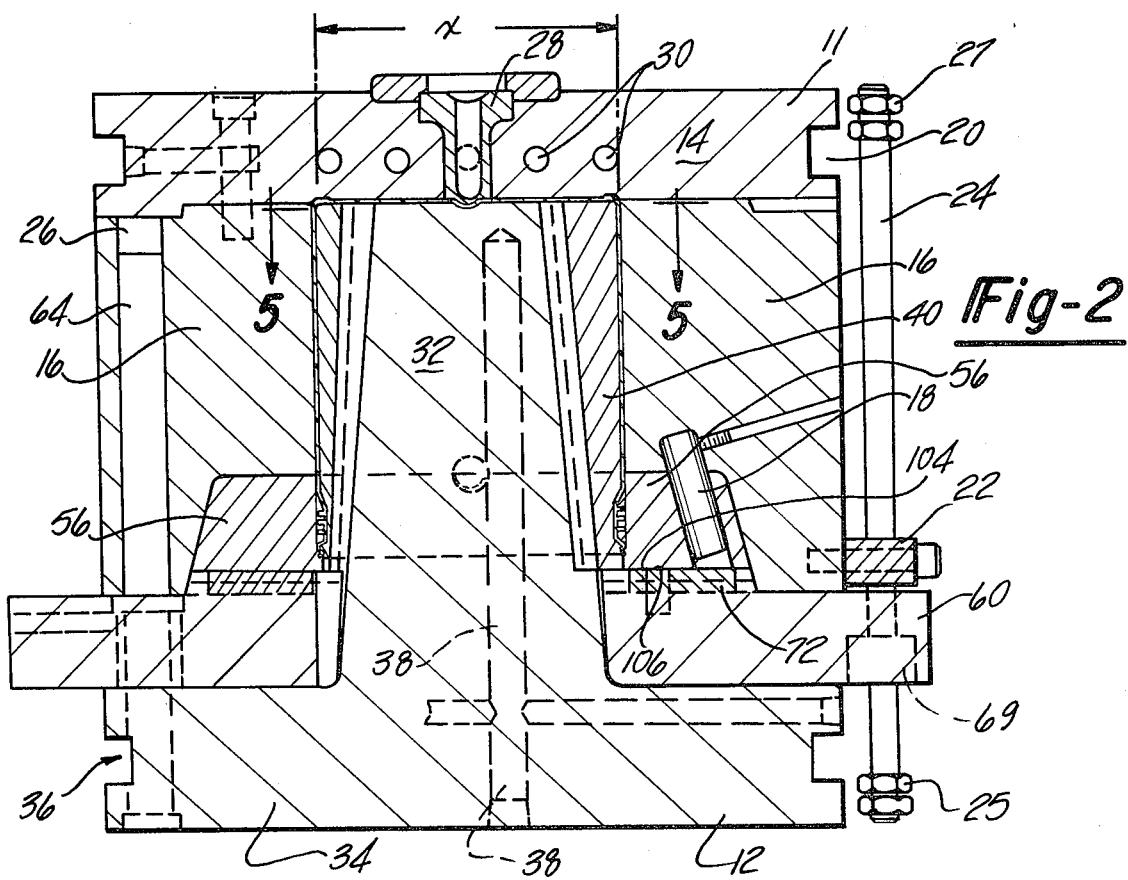
FIG. 2 is a sectional view taken along the line 2—2 of FIG. 1.

Referring now also to FIGS. 1–8 and 10, the container 86 is of unitary plastic construction and is preferably formed by the well known injection molding process using a mold as shown in FIGS. 1 and 2 which comprises a first and second mold portion 11 and 12 respectively. The first mold portion 11 includes a circularly shaped base 14 having a notch 20 in the periphery thereof adapted to be releasably mounted on a movable ram (not shown) of a conventional injection mold machine (not shown). An injection nozzle 28 is centrally disposed in the base 14 and is adapted to be connected with a source of fluent molding material in order to inject such material into the mold cavity. A plurality of spaced cooling ports 30 extend longitudinally through the base 14 and are adapted to be connected with a source of compressed air for selectively cooling the first mold portion 11. The first mold portion 11 further includes an annularly shaped sidewall 16 depending downwardly from the base 14; base 14 and sidewall 16 form portions of a mold cavity which define the sidewall 88 and base 90 of the molded container 86. Sidewall 16 is provided with a first set of circumferentially spaced guide bores 26 radially spaced from the molding surfaces and adapted for slidably receiving corresponding guide shafts 64 therein. Guide shafts 64 are secured to the second mold portion and slidably connect the first and second mold portions 11 and 12. Sidewalls 16 include a cutout portion therein adjacent the lower edge thereof to receive a plurality of later discussed rim molding segments 56 associated with the second mold portion 12. A plurality of circumferentially spaced actuating pins 18 are secured to the sidewall 16 and depend downwardly into the cutout area mentioned above at an angle inclined with respect to the longitudinal axis of the first and second mold portions 11 and 12.

A bracket 22 is secured to the exterior of one side of sidewall 16 and is adapted to mount a pair of spaced longitudinally extending drive rods 24 thereon for purposes which will become later apparent. Drive rods 24 each have stop members 25 and 27 in the nature of nuts respectively secured to each end thereof.

The second mold portion 12 broadly comprises a molding core including an inner core portion 32, and an outer, collapsable core portion 40 mounted on a circularly shaped base 34. Base 34 is provided with a notched area 36 in the periphery thereof in order to releasably mount the second mold portion on a stationary holding member of the injection molding apparatus. Inner core portion 32 is of circular cross section and is defined by inclined exterior sidewalls extending upwardly from the base 34 so as to provide a core in the form of a truncated cone. Inner core portion 32 is preferably formed integral with mold base 34 and is provided with a plurality of air delivery passages 38 for cooling the second mold portion 12.

Figure 3:
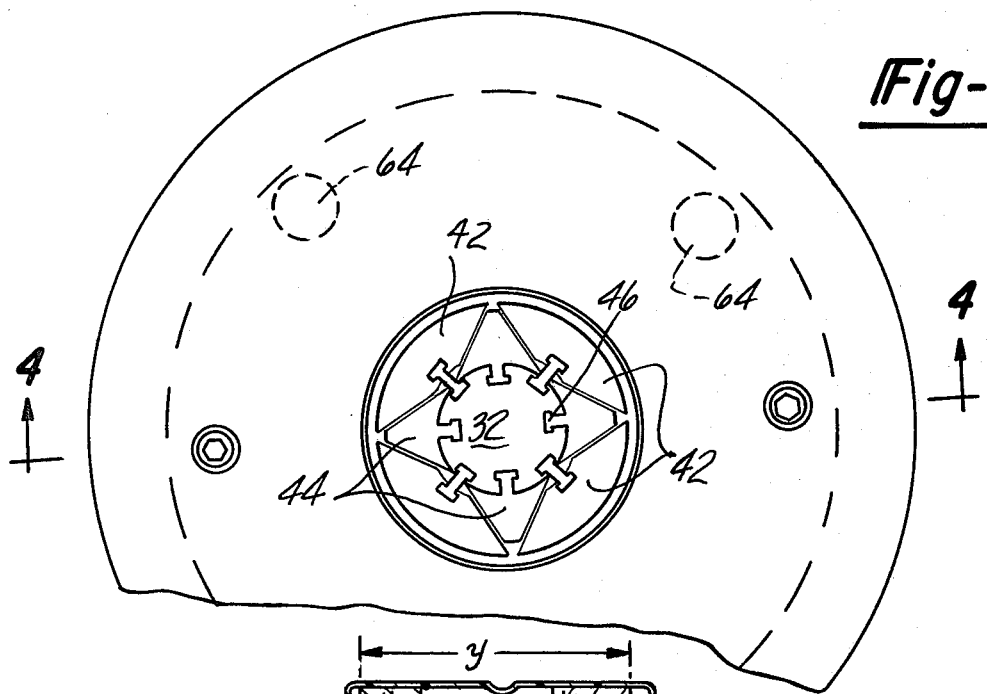
FIG. 3 is a plan view of one portion of the mold shown in FIG. 1, the details of the molding segments and guides having been deleted for clarity, and the outer core portion being shown in the collapsed position thereof.
Figure 4:
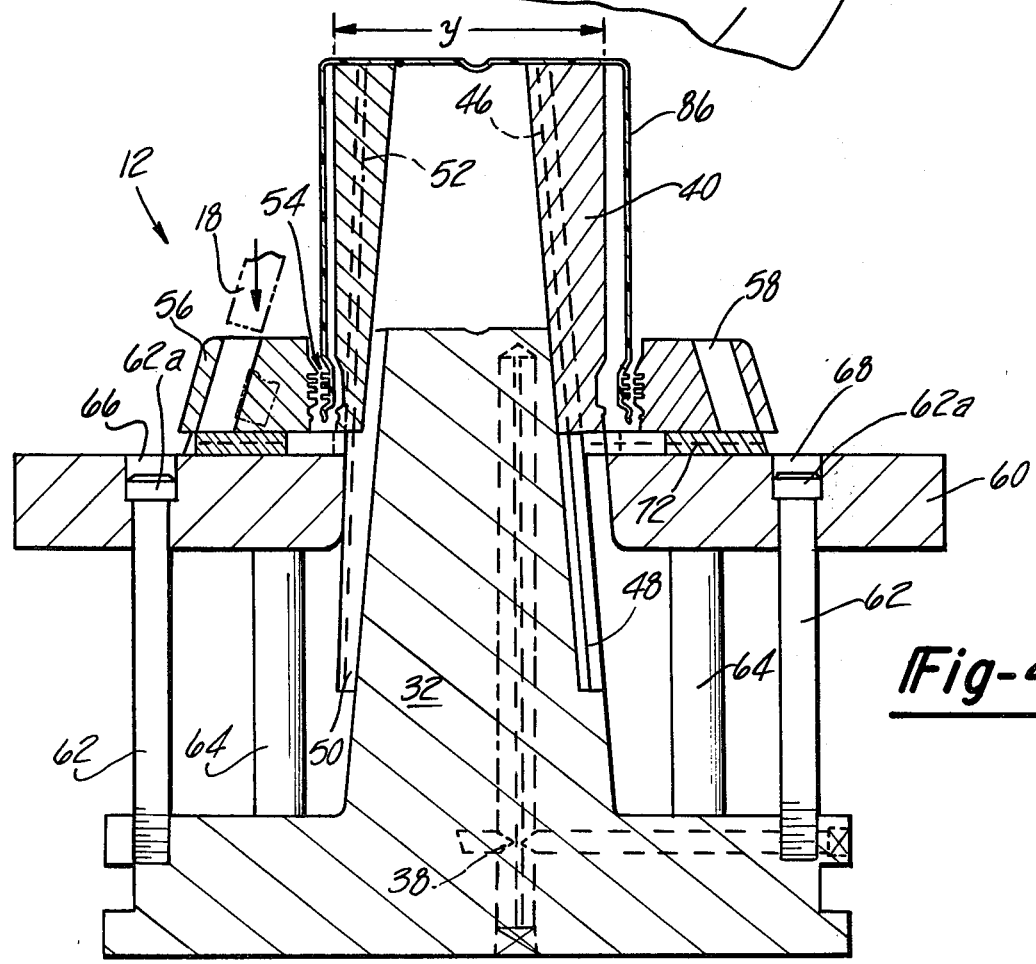
FIG. 4 is a sectional view taken along the line 4—4 in FIG. 3.
Figure 10:
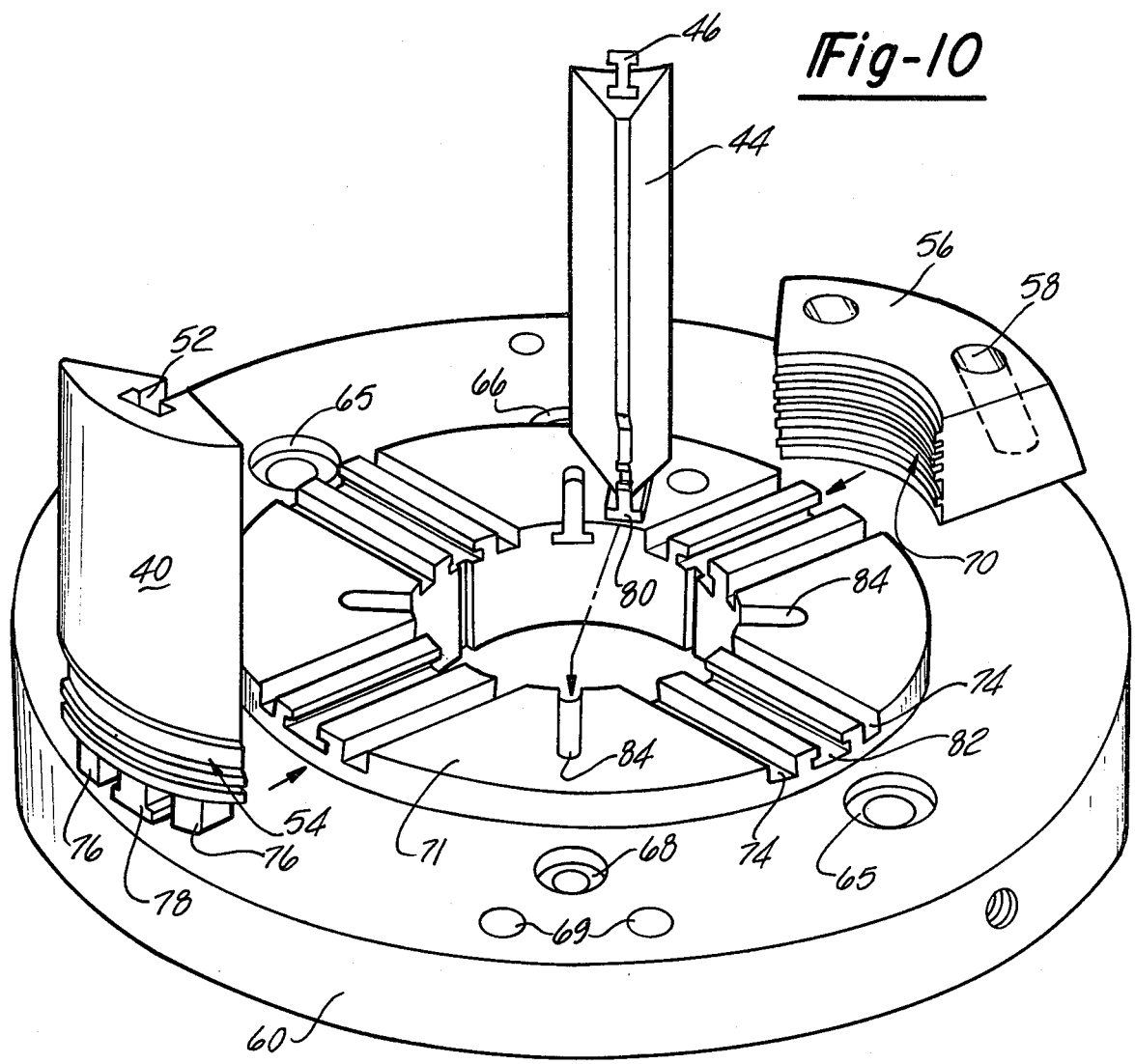
Figure 8:
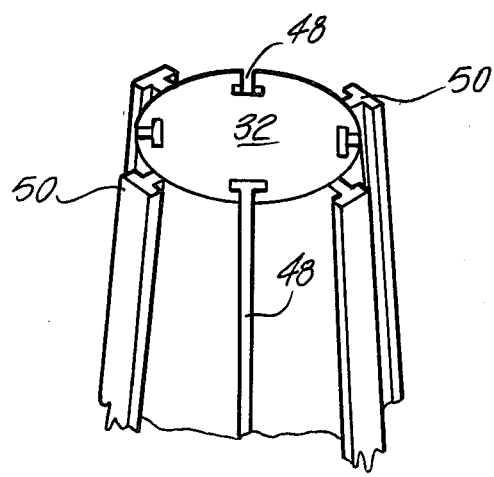
FIG. 8 is a perspective, fragmentary view of the inner core portion.

The outer collapsable core portion 40 is defined by a first and second set of molding core sections 42 and 44 respectively, each mounted for axial travel on the inner core portion 32 by latter discussed slide means. Each of the core sections 42 and 44 is of wedge shape, both in traverse and longitudinal cross section, as best seen in FIGS. 3 and 4. Core sections 42 include substantially curved outer surface areas forming a molding face of the mold cavity which are adapted to mold portions of the interior surface areas of the sidewalls 88 of the container 86. Core sections 44 likewise present a molding face but of lesser surface area than that of core sections 42.

When the outer, collapsable core portion 40 is expanded to a molding position, as shown in FIG. 5, the exterior molding faces of core sections 42 and 44 form a continuous cylindrically shaped molding core for forming the interior surface areas of sidewall 88 of the container 86. Core segments 42 and 44, which are alternately circumferentially disposed about inner core portion 32, are slidably mounted on inner core portion 32 by gibs 46 and 50 and T-shaped guideways 48 and 52. More particularly, each of the first set of core sections 42 is provided with a T-shaped guideway 52 therein at the juncture of the interior sidewalls thereof. Guideway 52 extends longitudinally at an angle inclined with respect to the outer molding face of segment 42. The inner portion 32 is provided with a plurality of circumferentially spaced, longitudinally extending, T-shaped gibs 50 which are slidably retained within the corresponding guideways 52. The second set of core sections 44 are provided with longitudinally extending, T-shaped gibs 46 secured to the interior side thereof opposite the molding face. Gibs 46 are inclined with respect to the exterior molding face of core sections 44 and extend essentially parallel to the outer sidewalls of inner core portion 32. Gibs 46 are slidably retained within longitudinally extending, T-shaped guideways 48 in the inner core portion 32. Thus, from the foregoing, it can be appreciated that the outer collapsable core portion 40 is mounted for axial sliding movement on the inner core portion 32 by means of gibs and corresponding guideways.

The exterior molding faces of each of the outer core sections 42 and 44 include an identical trough area 54 configured to form the interior surface areas 96 and locking edge construction 97 of the container 86.

Outer collapsable core portion 40 is mounted for axial movement on an annularly shaped mounting plate 60 which circumscribes the inner core portion 32 and is mounted for reciprocating longitudinal movement on the base 34 by means of guide pins 62. Guide pins 62 are secured to base 34 and are slidably received within guide bores 66 and 68 in the mounting plate 60. Guide bores 66 and 68 include an enlarged diameter section for accommodating a head 62a on guide pins 62; head 62a engages the mounting plate 60 adjacent the smaller diameter of the guide bores 66 and 68 to limit the longitudinal travel of mounting plate 60 away from base 34. Mounting plate 60 is further provided with a plurality of bores 65 therein for slidably receiving guide shafts 64 therethrough; guide shafts 64 are secured to base 34 and are slidably received within the guide bores 26 in the first mold portion 11 as previously discussed. Mounting plate 60 is provided with a pair of concentric through holes 69 of different diameters along one edge thereof for receiving the drive rods 24 therethrough. Upon separation of first and second mold portions 11 and 12, bracket 22 engages stop 27 thereby drawing the rods 24 through mounting plate 60 until stop 25 contacts mounting plate 60. Continued movement of the mold portions 11 and 12 away from each other results in stop 25 driving mounting plate 60 away from base 34, as will be discussed later in more detail.

Mounting plate 60 is provided with an annularly shaped, upstanding ledge 71 on one face near the inner diameter thereof. Ledge 71 has a first and second set of guide means defined therein in the nature of guide slots and keyways which slidably mount the core sections 42 and 44 thereon for radially sliding movement. More particularly, core sections 42 are provided with gibs 78 and a pair of spaced slides 76 on the lower face thereof which are respectively received by T-shaped keyways 82 and guide slots 74 in the ledge 71. Similarly, core sections 44 are provided with T-shaped gibs 80 which are slidably retained within radially extending keyways 84.

At this point, it may be appreciated that the molding cavity for forming the container 86 is defined in part by interior mold faces of base 14 and sidewall 16 of the first mold portion 11 as well as by the exterior molding face of the outer collapsable core portion 40. The mold cavity is further defined by a plurality of rim molding segments 52 each of which includes a plurality of arcuately shaped ribs on the molding face thereof for forming exterior portions of the rim 94 of the container 86. Each of the rim molding segments 56 is provided with a T-shaped key 72 secured to the bottom surface thereof which is slidably received within a corresponding keyway 82. Thus, both the core sections 42 and molding segments 56 are slidably mounted in keyways 82 with the molding segments 56 circumscribing and being radially spaced from the outer collapsable core portion 40. Each of the rim molding segments 56 is provided with a cam opening 58 in the top surface therein, which extends downwardly at an angle inclined from the longitudinal axis of the first and second mold portions 11 and 12 respectively. Cam openings 58 are longitudinally aligned with the actuating pins 18 so as to slidably receive the latter when the first mold portion 11 travels axially toward mounting plate 60. Each of the molding segments 56 is provided with an indentation 104 in the bottom surface thereof radially aligned with a biased detent member 106 which is received within the indentation 104 upon outward sliding movement of the rim molding segments 56 so as to limit the outward radial movement of the segments 56, as will be discussed in more detail below.

Turning now to the operation of the molding apparatus of the present invention, the first and second mold portions 11 and 12 are respectively attached at their corresponding bases 14 and 34 to fixed and movable mold bases of a conventional injection molding machine. Although not specifically disclosed herein the molding apparatus of the present invention will be provided with conventional means for heating and cooling the mold, and the nozzle 28 will be connected with a suitable source of flowable thermoplastic material. With the mold in a closed, molding position, as shown in FIG. 2, the outer collapsable core portion 40 forms a continuous cylindrically shaped molding face for forming the interior surface areas of the container 86, while the interior surfaces of the sidewall 16 and base 14 along with the molding face of the rim molding segment 56 define that portion of the mold cavity for forming the exterior surface areas of the container 86. Heated thermoplastic material introduced under pressure through the nozzle 28 enters the mold cavity and assumes the shape of the container 86. After the container 86 has been thusly molded, the first mold portion 11 is retracted longitudinally away from the second mold portion 12 with the guide shaft 64 acting to maintain the mold portions in longitudinal registration with each other.

As the first and second mold portions 11 and 12 begin to separate, actuating pins 18 disposed within cam openings 58 engage a portion of the sidewalls defining openings 58, thereby exerting a radially outwardly directed force on each of the rim molding segments 56; this outwardly directed force causes the molding segments 56 to slide radially outward away from the molded rim 94 of the container 86 to a standby position in clearing relationship to the molded container 86. With continued travel of the first mold portion 11 away from the second mold portion 12, actuating pins 18 are completely removed from the cam openings 58, but remain in longitudinal registration therewith.

Further separation of the mold portions results in the stop element 25 engaging the mounting plate 60 thereby sliding the mounting plate 60 away from the base 34 on guide pins 62. As mounting plate 60 slides axially outwardly away from base 34, the outer collapsable core portion 40 slides axially outward from the inner core portion 32 and commences to collapse in a radial direction. More specifically, each of the core sections 42 and 44 slides longitudinally on the inner core portion 32 as well as radially on the ledge 71 of mounting plate 60; inward radial movement of segments 44 produces a radial clearance for allowing core sections 42 to likewise shift radially inward, thereby reducing the diameter of the outer collapsable core portion 40 a sufficient distance to provide radial spacing between the molding faces of core sections 42 and 44 and the interior surface areas 96 of the rim 94 of the container 86. It may be appreciated from the foregoing, that the molding sections 42 and 44 simultaneously travel in both longitudinal and radial directions throughout their entire lengths and that the magnitude of radial movement thereof is conveniently determined by the degree of inclination or "tapering" of the slide means mounting the outer core portion 40 to the inner core portion 32. The mounting plate 60, along with molding segments 56 and outer core portion 40 continue to travel away from base 34 until the head portion 62a engages mounting plate 60; at this point, or as soon as the outer core portion 40 has collapsed sufficiently to produce radial clearance between the container 86 and the molding core, the container 86 may be removed from the molding core by any suitable means such as the injection of air between the molding core and the interior surface areas of the molded container 86. After the molded container 86 is removed from the mold, the first mold portion 11 is returned to its closed molding position. As the first mold portion 11 returns to its molding position, bracket 22 engages mounting plate 60 thereby urging the latter along with the outer core portion 40 to travel longitudinally toward the base 34. The return of mounting plate 60 results in each of the core sections 42 and 44 sliding longitudinally and radially back to their extended, molding position. Eventually, actuating pins 18 enter the cam openings 58 of rim molding segments 56 and engage inclined surface areas thereof, thereby imparting radially inwardly directed forces on segments 56 which cause the latter to shift inwardly to their respective molding positions. Continued travel of the first mold portion completely closes the mold cavity in preparation for the next molding cycle.

From the foregoing, it can be appreciated that the molding apparatus and process of the present invention not only provide for the reliable accomplishment of the objects of the invention but do so in a particularly efficient and economical manner. It is recognized, of course, that those skilled in the art may make various modifications or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

Having thus described the invention, what is claimed is:

1. Apparatus for injection molding a substantially straight-sided cylindrical pail having a reduced diameter neck adjacent the opening thereof comprising:
   a base (12 or 34);
   a tapered inner core (32) on said base and having slide means (48), (50) thereon; a plurality of alternately reversely-segmented outer core elements (40) slideably mounted on said slide means (48), (50) for reciprocal motion along the axis of said tapered inner core;
   said outer core elements (40) collectively defining a cylindrical outer surface to form the inner diameter of said pail, said cylindrical outer surface having a reduced diameter portion to form the neck of said pail;
   ejector means (60) for effecting relative displacement between the outer core elements (40) and the base (14) to collapse and expand the outer core elements and the cylindrical outer surface formed thereby to permit a finished pail to be removed from the core elements (40);
   a plurality of outer neck mold segments (56) disposed on said ejector means (60) and about but spaced radially from the outer core elements (40) to define the outer neck surface of the pail;
   means (72) for permitting sliding of said neck mold segments (56) radially inwardly and outwardly on said ejector means (60) to mold and release said pail, respectively;
   an outer mold (16) having a substantially straight-sided cylindrical inner surface to define the outer surface of said pail;
   means (11) for reciprocally displacing mold (16) relative to the base (14) between a molding position in which mold (16) rests on and sealingly contacts said segments (56) and a release position axially remote from said segments (56);
   and means (18) mechanically interconnecting the mold (16) with segments (56) to slide the segments (56) radially outwardly as the mold (16) moves to the remote position.

2. Apparatus is defined in claim 1 wherein each of said plurality of neck mold segments (56) is circumferentially grooved to form ring elements in the outer neck surface of the pail and the inner diameter of the mold (16) corresponds substantially to the inner diameter of the grooves in said segments (56) to define a substantially constant overall outer diameter for said pail.

3. Apparatus is defined in claim 2 wherein each of said plurality of outer neck mold segments (56) is longitudinally grooved to form a vertical rib (100) in the outer neck surface of the pail.

4. Apparatus is defined in claim 1 wherein means (18) comprises pins angularly affixed to said mold (16) and sockets formed angularly in said neck mold segments (56) to receive said pins.

5. Apparatus is defined in claim 1 wherein ejector means (60) is a plate.

6. Apparatus is defined in claim 1 wherein mold (16) comprises means (28) for admitting fluid plastic material to form said pail.

* * * * *

UNITED STATES PATENT AND TRADEMARK OFFICE
CERTIFICATE OF CORRECTION

PATENT NO. : 4,383,819
DATED : May 17, 1983
INVENTOR(S) : ILIJA LETICA

It is certified that error appears in the above-identified patent and that said Letters Patent are hereby corrected as shown below:

The word "collapsible" is misspelled throughout the patent; please correct this error in all instances as follows:

Column 1, lines 11, 64, and 66, delete "collapsable" and insert --collapsible--.

Column 2, lines 3, 14, and 34,            "

Column 4, lines 51 and 63,                "

Column 5, lines 8, 34, and 42,            "

Column 6, lines 18, 29, and 56,           "

Column 7, lines 19 and 27,                "

Column 1, line 32, delete "obsolutely" and insert --absolutely--. (Our error)

Column 1, line 40, delete "flexion" and insert --flexes--.

Column 2, line 28, delete "one step".

Column 4, line 68, delete "traverse" and insert --transverse--.

UNITED STATES PATENT AND TRADEMARK OFFICE
CERTIFICATE OF CORRECTION

PATENT NO. : 4,383,819
DATED : May 17, 1983
INVENTOR(S) : ILIJA LETICA

It is certified that error appears in the above-identified patent and that said Letters Patent are hereby corrected as shown below:

Column 6, line 20, delete "52" and insert --56--.

Column 7, line 20, delete "outward" and insert --away--.

Column 2, line 21, after "provide", insert --apparatus for molding--.

Column 2, lines 26 - 28, delete "Another important object of the invention is to provide a one step process for molding a container of the type mentioned above."

Column 3, lines 24 and 25, after "by", delete "the process of the present invention using."

Column 3, line 36, delete "a process and".

Column 5, line 43, after "mounting", insert --or ejection--.

Column 7, line 63, delete "and process".

Column 7, line 64, delete "provide" and insert --provides--.

UNITED STATES PATENT AND TRADEMARK OFFICE
CERTIFICATE OF CORRECTION

PATENT NO. : 4,383,819

DATED : May 17, 1983

INVENTOR(S) : ILIJA LETICA

It is certified that error appears in the above-identified patent and that said Letters Patent is hereby corrected as shown below:

Column 8,
    Claim 1 should read as follows:

1. Apparatus for injection molding a substantially straight-sided cylindrical pail having a reduced diameter neck adjacent the opening thereof, comprising:

a base (34);

a tapered inner core (32) on said base (34) and having slide means (48, 50) thereon;

a plurality of alternately reversely-segmented outer core elements (40) slideably mounted on said slide means (48, 50) for reciprocal motion along the axis of said tapered inner core;

said outer core elements (40) collectively defining a cylindrical outer surface to form the inner diameter of said pail, said cylindrical outer surface having a reduced diameter portion to form the neck of said pail;

UNITED STATES PATENT AND TRADEMARK OFFICE
CERTIFICATE OF CORRECTION

PATENT NO. : 4,383,819
DATED : May 17, 1983
INVENTOR(S) : ILIJA LETICA

It is certified that error appears in the above-identified patent and that said Letters Patent is hereby corrected as shown below:

ejector means (60) carried by said base (34) for effecting relative displacement between said outer core elements (40) and said base (34) to collapse and expand said outer core elements and said cylindrical outer surface formed thereby to permit a finished pail to be removed from said core elements (40);

a plurality of outer neck mold segments (56) on said ejector means (60), said neck mold segments (56) being disposed about and spaced radially from said outer core elements (40) to define the outer neck surface of the pail;

means (72) for permitting sliding of said neck mold segments (56) radially inwardly and outwardly on said ejector means (60) to mold and release said pail, respectively;

an outer mold (16) reciprocally mounted relative to said base (34) and having a substantially straight-sided cylindrical inner surface to define the outer surface of said pail;

UNITED STATES PATENT AND TRADEMARK OFFICE
CERTIFICATE OF CORRECTION

PATENT NO. : 4,383,819

DATED : May 17, 1983

INVENTOR(S) : ILIJA LETICA

It is certified that error appears in the above-identified patent and that said Letters Patent is hereby corrected as shown below:

means (11) connected to said mold (16) for reciprocally displacing said mold (16) relative to said base (34) between a molding position in which said mold (16) rests on and sealingly contacts said segments (56) and a release position axially remote from said segments (56); and means (18) mechanically interconnecting said mold (16) with said segments (56) to slide said segments (56) radially outwardly as said mold (16) moves to said release position.

UNITED STATES PATENT AND TRADEMARK OFFICE
CERTIFICATE OF CORRECTION

PATENT NO. : 4,383,819
DATED : May 17, 1983
INVENTOR(S) : ILIJA LETICA

It is certified that error appears in the above-identified patent and that said Letters Patent are hereby corrected as shown below:

Column 8, line 49, delete "is" and insert --as--.

Column 8, line 56, delete "is" and insert --as--.

Column 8, line 60, delete "is" and insert --as--.

Column 8, line 60, after "wherein", insert --said interconnecting--.

Column 8, line 64, delete "is" and insert --as--.

Column 8, line 64, after "wherein", insert --said--.

UNITED STATES PATENT AND TRADEMARK OFFICE
CERTIFICATE OF CORRECTION

PATENT NO. : 4,383,819
DATED : May 17, 1983
INVENTOR(S) : ILIJA LETICA

It is certified that error appears in the above—identified patent and that said Letters Patent are hereby corrected as shown below:

Column 8, line 66, delete "is" and insert --as--.

Column 8, line 66, after "wherein", insert --said--.

Signed and Sealed this

Twenty-seventh Day of September 1983

[SEAL]

Attest:

GERALD J. MOSSINGHOFF

Attesting Officer          Commissioner of Patents and Trademarks